US012706082B2

(12) United States Patent
Nassar et al.

(10) Patent No.: US 12,706,082 B2
(45) Date of Patent: Aug. 11, 2026

(54) SPEECH TRANSLATION USING LATENCY BASED FILLER GENERATION

(71) Applicant: EzDubs Inc., San Francisco, CA (US)

(72) Inventors: Kareem Aladdin Nassar, Palo Alto, CA (US); Amrutavarsh Kinagi, San Francisco, CA (US); Padmanabhan Krishnamurthy, San Francisco, CA (US)

( * ) Notice: Subject to any disclaimer, the term of this patent is extended or adjusted under 35 U.S.C. 154(b) by 96 days.

(21) Appl. No.: 18/585,213

(22) Filed: Feb. 23, 2024

(65) Prior Publication Data

US 2025/0273193 A1 Aug. 28, 2025

(51) Int. Cl.

*G10L 13/027* (2013.01)
*G10L 13/08* (2013.01)
*G10L 15/00* (2013.01)
*H04L 12/18* (2006.01)

(52) U.S. Cl.

CPC .......... *G10L 13/027* (2013.01); *G10L 13/086* (2013.01); *G10L 15/005* (2013.01); *H04L 12/1827* (2013.01)

(58) Field of Classification Search

None

See application file for complete search history.

(56) References Cited

U.S. PATENT DOCUMENTS 11,182,314 B1 * 11/2021 Borkovic ............... G06N 3/063
2008/0077390 A1 * 3/2008 Nagao ..................... G10L 15/28 704/7
2010/0121629 A1 * 5/2010 Cohen .................... G06Q 40/12 704/235
2013/0238312 A1 * 9/2013 Waibel .................. G06F 40/117 704/8
2015/0134320 A1 * 5/2015 Rangarajan Sridhar ..................... G10L 15/005 704/2
2015/0371628 A1 * 12/2015 Kreifeldt ................ G10L 15/02 704/254
2016/0092438 A1 3/2016 Sonoo (Continued)

FOREIGN PATENT DOCUMENTS

CN 111178092 5/2020
CN 113660432 11/2021

(Continued)

OTHER PUBLICATIONS

PCT International Search Report and Written Opinion in PCT/US2025/016916 mailed on May 29, 2025 (pp. 1-6).

*Primary Examiner* — Jakieda R Jackson

(57) ABSTRACT

A system translates audio content. Speech information is derived from the audio content in a source language. The system dynamically translates the speech information to a target language using a translatable unit (TU) model. The model determines a dynamic threshold that controls an amount of the speech information used to form TUs. Responsive to reaching a dynamic threshold for a TU, the model translates the TU to the target language to form a translated unit. Responsive to a delay between a most recent translated unit and a forthcoming translated unit exceeding a threshold time value, the system selects filler content that is in the target language to at least partially fill the delay. A translated audio signal is synthesized that is in the target language using the most recent translated unit and the filler content.

17 Claims, 6 Drawing Sheets

(56) References Cited

U.S. PATENT DOCUMENTS

| | | | | |
|---|---|---|---|---|
| 2019/0095430 | A1* | 3/2019 | Smus | G06F 40/58 |
| 2020/0075000 | A1* | 3/2020 | Merhej | H04L 51/214 |
| 2020/0192986 | A1* | 6/2020 | Zhang | G10L 15/22 |
| 2020/0194000 | A1* | 6/2020 | Xian | G10L 15/30 |
| 2020/0285815 | A1* | 9/2020 | Zhou | G10L 15/005 |
| 2020/0372114 | A1* | 11/2020 | Auvenshine | G10L 15/22 |
| 2022/0148567 | A1* | 5/2022 | Yu | G10L 13/04 |
| 2022/0343938 | A1* | 10/2022 | Suto | G10L 21/10 |
| 2022/0414349 | A1* | 12/2022 | Rathnam | G06F 40/58 |
| 2023/0298566 | A1* | 9/2023 | Li | G10L 15/16 704/232 |
| 2023/0351124 | A1* | 11/2023 | Chollampatt Muhammed Ashraf | G10L 15/26 |
| 2024/0212675 | A1* | 6/2024 | Kim | G10L 15/005 |
| 2024/0395240 | A1* | 11/2024 | Chen | G10L 15/04 |
| 2025/0225341 | A1* | 7/2025 | Arslan | G10L 15/26 |

FOREIGN PATENT DOCUMENTS

| | | |
|---|---|---|
| CN | 116468051 | 7/2023 |
| KR | 20220053412 X | 4/2022 |

* cited by examiner

SPEECH TRANSLATION USING LATENCY BASED FILLER GENERATION

FIELD OF THE INVENTION

This disclosure relates generally to speech translation, and more specifically to speech translation using latency based filler generation.

BACKGROUND

Conventional translation approaches often struggle with a trade-off between low latency and high accuracy. These approaches may translate speech in a serial manner using units of fixed size. While reducing the size of the unit to translate reduces latency, it often does so at the expense of accuracy of the translation. This tradeoff can be particularly problematic when translating one language (e.g., English) to another markedly different language (e.g., Hungarian, Mandarin, etc.) in the context of a live broadcast where both accuracy and low latency are important.

SUMMARY

In accordance with one or more aspects of the disclosure, speech translation using latency based filler generation is described. A client device is configured to present audio content, and in some cases corresponding video content. A user of the client device may select to receive a translated version of the audio content, where speech in the audio content has been translated from a source language to a target language. Responsive to the selection, the client device may request a translated version of the audio content from a translation system.

The audio content may identify an audio signal within the audio content that corresponds to speech in the source language. The translation system may pre-process the audio signal to determine speech information. A translation unit (TU) model may form translation units (TUs) from portions of the speech information as it is received, and translate the TUs to the target language forming translated units. The size of a TU can vary from one TU to a forthcoming TU (e.g., due to differences in grammar between the source language and the target language) and there may therefore be a latency between translated units. The translation system may address the latency by, e.g., generating filler content (e.g., "uh," "um," etc.) and using the filler content to offset the latency. The translation system may synthesize a translated audio signal using the translated units and filler content in areas of the translated audio signal where latency would otherwise exceed a threshold value. The translation system provides the translated audio signal to the client device.

In some embodiments, the translation system may have previously translated the audio content for a particular target language, and stores the resulting translated audio signal in a data store. In these cases, responsive to receiving a request for a translation of the audio content from a client device, the translation system retrieves (e.g., from the data store) the corresponding translated audio signal and provides it to the client device.

In some aspects, the techniques described herein relate to a method, performed at a computer system including a processor and a non-transitory computer readable medium, including: dynamically translating speech information that is in a first language to a second language using a translatable unit (TU) model, wherein the TU model: determines a dynamic threshold that controls an amount of the speech information used to form a TU, and responsive to reaching the dynamic threshold for the TU, translating the TU to the second language to form a translated unit; responsive to a delay between a most recent translated unit and a forthcoming translated unit exceeding a threshold time value, selecting filler content that is in the second language to at least partially fill the delay; and synthesizing a translated audio signal that is in the second language using the most recent translated unit and the filler content.

In some aspects, the techniques described herein relate to a non-transitory computer-readable storage medium including stored instructions, the instructions when executed by a processor of a device, cause the device to: dynamically translate speech information that is in a first language to a second language using a translatable unit (TU) model, wherein the TU model is configured to: determine a dynamic threshold that controls an amount of the speech information used to form a TU, and responsive to reaching the dynamic threshold for the TU, translate the TU to the second language to form a translated unit; responsive to a delay between a most recent translated unit and a forthcoming translated unit exceeding a threshold time value, and select filler content that is in the second language to at least partially fill the delay; and synthesize a translated audio signal that is in the second language using the most recent translated unit and the filler content.

In some aspects, the techniques described herein relate to a computer system including: a processor; and a non-transitory computer readable storage medium having instructions encoded thereon that, when executed by the processor, cause the processor to: dynamically translate speech information that is in a first language to a second language using a translatable unit (TU) model, wherein the TU model is configured to: determine a dynamic threshold that controls an amount of the speech information used to form a TU, and responsive to reaching the dynamic threshold for the TU, translate the TU to the second language to form a translated unit; responsive to a delay between a most recent translated unit and a forthcoming translated unit exceeding a threshold time value, and select filler content that is in the second language select filler content that is in the second language to at least partially fill the delay; and synthesize a translated audio signal that is in the second language using the most recent translated unit and the filler content.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
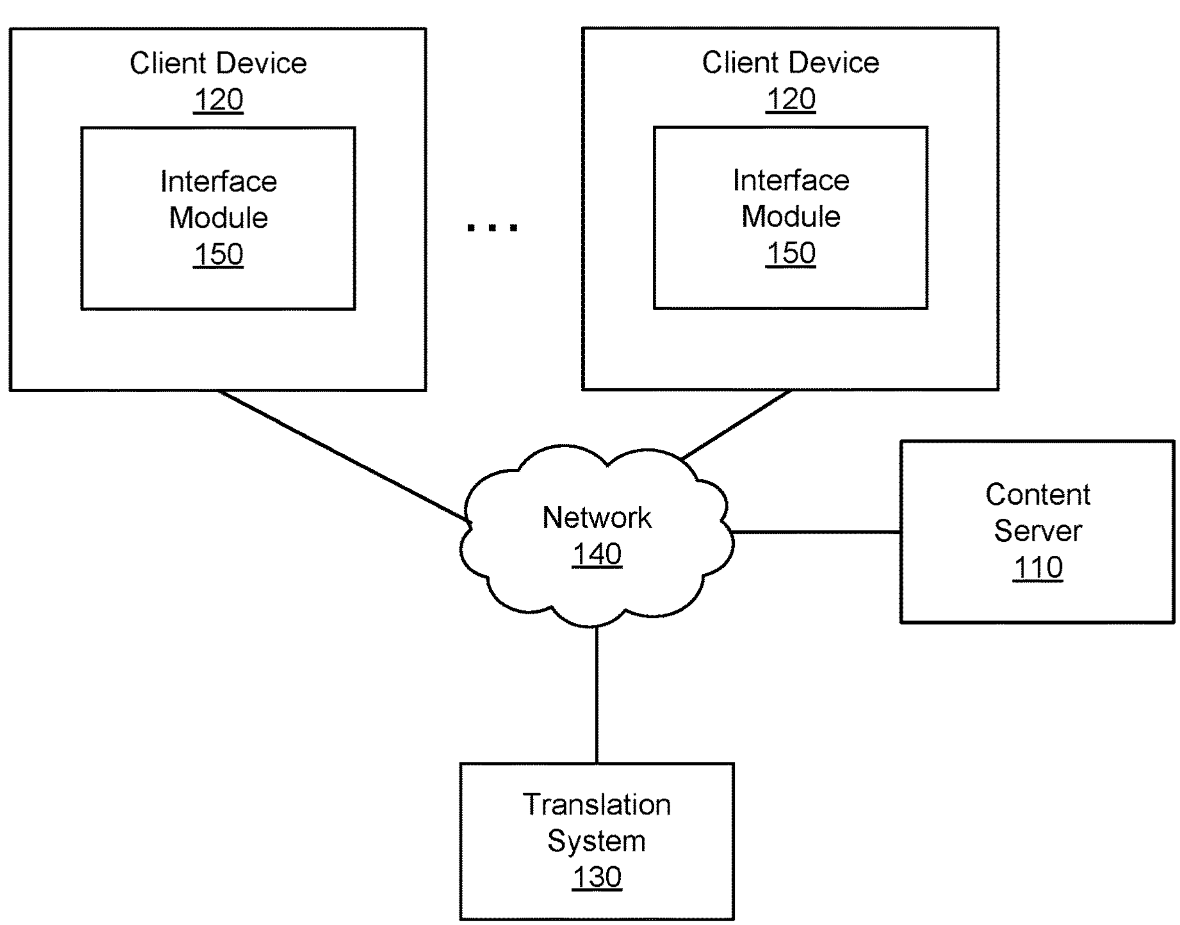
FIG. 1 illustrates an example environment for a stress performance training system, in accordance with one or more embodiments.

FIG. 1 illustrates an example environment for a system 100, in accordance with one or more embodiments. The environment illustrated in FIG. 1 includes a content server 110, one or more client devices 120, and a translation system 130, that are coupled via a network 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The content server 110 provides content via the network 140 to one or more client devices 120. The content server 110 includes one or more servers that provide video content, audio content, or both. Audio content is composed of one or more audio signals, where each audio signal corresponds to a different speaker. In addition to the one or more audio signals, audio content may also include non-speech signals (e.g., music, background noise, etc.). Video content includes images, and in some embodiments, may have corresponding audio content. For example, a video conference may have a video of a speaker and corresponding audio of speech for that speaker. The content server 110 may be, e.g., a conference server, a website (e.g., news server), a social media platform, a streaming service, some other device on a network that provides content, or some combination thereof. A conference server is one or more servers through which various client devices conduct conference calls.

The client device 120 is a device through which a user may interact with the content server 110, other client devices, the translation system 130, or some combination thereof. The client device 120 can be a personal or mobile computing device, such as a smartphone, a tablet, a laptop computer, or desktop computer. The client device 120 includes an interface module 150 that enables a user of the client device 120 to interact with received audio content, translated audio signals, non-speech signals, and in some embodiments, video content (e.g., that corresponds to the audio content), and translated video content. The interface module 150 may be, e.g., a browser, a conferencing app, a translation app, some other interface for a user to interact with content, or some combination thereof. The interface module 150 may provide a translation option (e.g., button, link, etc.) through which a user of the client device 120 can activate translation of audio content from a source language to a target language. The source language is the language spoken in the received audio content. The target language is a language other than the source language that the source language may be translated to via the system 100. For example, the client device 120 may be presenting audio content that includes an audio signal that is in a source language (e.g., Chinese) from the content server 110. In some embodiments, the audio content may also include one or more non-speech signals (e.g., music, background noise, etc.). The translation option may, e.g., allow a user of the client device 120 to select to receive a translated version of the audio content. In some embodiments, the translation option may also allow the user to select a target language (e.g., English) for the translation. Responsive to the selection, the interface module 150, coordinates with the translation system 130 to receive a translated audio signal, where the translated audio signal is a version of the received audio signal that has been translated to the target language. In some embodiments, the received audio signal may be accompanied by the non-speech signals (e.g., music, background noise, etc.) that were in the audio content. In a video conferencing system that streams live audio to one or more listeners, the translation may occur in substantially real-time (or be perceived as such by the listener) with limited latency as described further herein. Examples of the interface module 150 are described below in detail with regard to FIGS. 3A-C.

The translation system 130 translates one or more audio signals of the audio content. The translation system 130 is communicatively coupled to one or more client devices 120 via the network 140, and may also be communicatively coupled to the content server 110 via the network 140. The translation system 130 may receive the audio signals as streaming audio and process the audio signal as it is received to generate the translated audio as a streamed output. The translation system 130 may preprocess (e.g., signal separation, speech to text conversion, etc.) the audio content (as it is received in streamed chunks) to form speech information for some or all of the one or more audio signals. The translation system 130 may translate the speech information to the target language using a translatable unit (TU) model. The TU model is a machine learned model that forms TUs based on the speech information associated with a given audio signal (and corresponding speaker), and translates the TUs to the target language to form translated units. The translated units may be generated after each TU is received in the audio stream to generate streamed output of translated units with limited latency between receiving the audio from the source and outputting corresponding translated audio at the receiver.

In an example implementation, the translation system 130 may utilize a speech-to-text engine to generate the text representing the speech in the original language and then apply the TU model to generate translated units in text form in the second language. In other embodiments, the translation system 130 may generate a machine encoding of the speech in the original language that does not necessarily constitute human-readable text. The translation system 130 may then apply the TU model to generate translated units representing a machine encoding of the speech in the second language that does not necessarily constitute human-readable text. In this embodiment, the machine encodings may be derived from various feature extraction or other encoding techniques (e.g., HuBERT) to generate encodings that represent the information in speech content.

The translation system 130 uses TUs of variable length. Shorter TUs generally facilitate faster translation. And in some embodiments, the translation system 130 attempts to minimize the size of each of the TUs. However, as a size of a TU (e.g., amount of speech within a TU) can vary from one TU to a next TU (e.g., due to differences in grammar between the source language and the target language) there may be a latency between translated units. This latency if not addressed could result in awkward pauses in the translated audio signal. In some instances, a longer TU may be desired because the best translation of a received term cannot be determined until a subsequent modifying term is received. For example, "Joe goes to the village by foot" translated into French reads "Joe va au village à pied." In this example, "Joe" and "goes" may be treated as respective TUs if the translation system 130 determines that the next words in the sequence are unlikely to change their translation. Thus, these words may be translated without waiting to receive further words. Continuing on, the phrase "to the" may be translated into different terms in French based on what they are modifying. For example, while "to the village" translates to "au village," in contrast, "to the city" translates to "en ville." So, for this sentence, the translation system 130 may determine that the single word "to," or the combination "to the," is not sufficient information to ensure translation accuracy and therefore do not meet the criteria for a TU. Instead, the translation system 130 increases a length of the TU to gather enough context to ensure a translation of at least a threshold quality. In this example, once the word "village" is obtained, the translation system may then determine that the longer phrase "to the village" can be translated. Likewise, the mode of transportation Joe uses to go to the village controls what "by" translates to in French. For example, while "by foot" translates to "à pied," in contrast, "by car" translates to "en voiture." Thus, the translation system may determine that the subsequent word "by" is not yet sufficient to translate by itself, and instead waits to receive the full phrase "by foot", which it can then translate as a TU to "à pied." Thus, for an accurate translation, the translation system 130 may dynamically modify the length of a TU to maintain a target level of accuracy. The above example helps illustrate that increasing a length of a TU generally increases translation accuracy, but can introduce latency between a most recent translated unit and a forthcoming translated unit. For example, "Joe" and "goes" may be translated with minimal latency, but longer latency may be introduced in the next phrase because the translation system 130 may wait for the full phrase "to the village" before performing the translation.

While the above represents a simplified example for translations between languages that have many similarities, translations between more dissimilar languages may introduce significantly longer latencies. In many cases, the grammatical ordering of terms in a longer phrase a may be significantly different between languages. Thus, to avoid the output translation being out of order, the translation system 130 may wait for the entire phrase to be received before it can be outputting the translation. For example, in the Mandarin translation of the phrase, "I study and live in New York," the Mandarin term corresponding to "New York" grammatically goes near the beginning of the phrase rather than at the end. Thus, the translation system 130 may determine that it cannot output a translation for "I study and live in . . . " until it receives the term "New York" since otherwise the outputted translation will be out of order. For longer more complicated phrases and sentences, the different expected ordering of grammatical elements can introduce even more significant latencies in translation.

In some embodiments, the translation system 130 addresses latency by generating filler content to be inserted between translated units that are separated by more than a threshold period of time. Filler content includes words or sounds that indicate that a speaker is not done speaking but may have little meaning with regard to the message being conveyed in the speech. Note that the sounds may be non-words like "breathing" or some other sound that indicates that a speaker is not done speaking. In English, filler content may include phrases like, e.g., "uh", "um", "like", "so", etc. In other cases, the translation system 130 may dynamically generate filler content based on the already translated speech, such as repeating a previously spoken phrase. Note filler content may differ based on target language. For example, while "uh" or "um" may be used as a filler in English, a French equivalent is "euh." The translation system 130 may analyze the speech information and/or the corresponding audio signal to determine speech characteristics associated with the speaker, and generate filler content for the target language based on the determined speech characteristics.

The translation system 130 synthesizes, for some or all of the speakers, respective translated audio signals using translated units and filler content. In some embodiments, the translation system 130 may maintain continuous translated speech in the translated audio signal by adjusting a pronunciation time for words (e.g., filler content and/or translated units). The one or more translated audio signals may be associated with some or all of any non-speech signals (e.g., music, background noise) that were part of the audio content.

The translation system 130 may furthermore synthesize translated audio signals in a manner that preserves characteristics of the original speaker's voice. For example, the translation system 130 may synthesize audio that mimics aspects of the speaker's tone, timbre, speaking cadence, volume, dynamics, or other speech characteristics. In this way, the synthesized translated speech may sound to an observer as if it is coming from the original speaker.

In embodiments, where the translation system 130 operates in a text domain (i.e., performing speech-to-text transcription of the audio content and text-to-text translation), the translation system 130 may include a text-to-speech synthesizer to synthesize speech from a stream of text that includes the translated unit and filler content. In embodiments where the translation system 130 operates based on other encodings of speech that does not necessarily comprise human-readable text, the translation system 130 may include a speech synthesizer configured to decode the encoded translation directly into synthesized speech (without necessarily generating human-readable text as an intermediate representation).

The translation system 130 may provide the one or more translated audio signals to the client device 120. In some embodiments, the translation system 130 may also provide some or all of any non-speech signals (that were part of the audio content) with the one or more translated audio signals. In this manner, the client device 120 may render the translated audio signal along with the associated non-speech signals. If the original audio signal is associated with corresponding video, the translation system 130 may furthermore output the video synchronously with the translated audio signal.

In some embodiments, the translation system 130 may have previously translated the one or more audio signals to the target language, and the translation system 130 retrieves the corresponding one or more translated audio signals and provides them to the client device 120. The translation system 130 is described in detail below with regard to FIG. 2.

The content server 110, the client device 120, and the translation system 130 can communicate with each other via the network 140. The network 140 is a collection of computing devices that communicate via wired or wireless connections. The network 140 may include one or more local area networks (LANs) or one or more wide area networks (WANs). The network 140, as referred to herein, is an inclusive term that may refer to any or all of standard layers used to describe a physical or virtual network, such as the physical layer, the data link layer, the network layer, the transport layer, the session layer, the presentation layer, and the application layer. The network 140 may include physical media for communicating data from one computing device to another computing device, such as MPLS lines, fiber optic cables, cellular connections (e.g., 3G, 4G, or 5G spectra), or satellites. The network 140 also may use networking protocols, such as TCP/IP, HTTP, SSH, SMS, or FTP, to transmit data between computing devices. In some embodiments, the network 140 may include BLUETOOTH or near-field communication (NFC) technologies or protocols for local communications between computing devices. The network 140 may transmit encrypted or unencrypted data.

Figure 2:
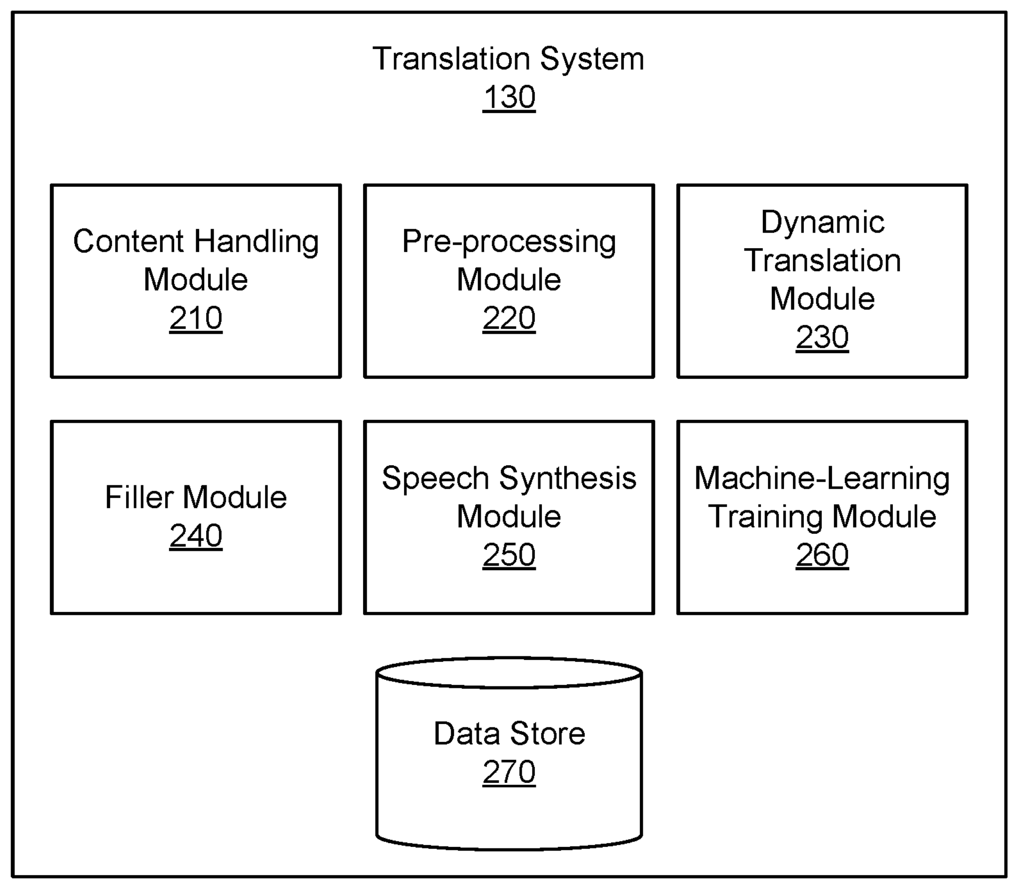
FIG. 2 illustrates a block diagram of a client device, in accordance with one or more embodiments.

FIG. 2 illustrates an example system architecture for the translation system 130, in accordance with one or more embodiments. The system architecture illustrated in FIG. 2 includes a content handling module 210, a pre-processing module 220, a dynamic translation module 230, a filler module 240, a speech synthesis module 250, a machine-learning training module 260, and a data store 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The content handling module 210 may receive a request from a client device (e.g., the client device 120) to provide a translated version of audio content. The request may specify one or more target languages for the audio content to be translated into. In some embodiments, the content handling module 210 checks the data store 270 to determine whether or not the translation system 130 previously translated the audio content and stored corresponding translated audio signal(s). In some embodiments, the content handling module 210 also checks the data store 270 to for any non-speech signals that were part of the audio content. If the translated audio signal(s) are in the data store 270, the content handling module 210 may stream the translated audio signal(s) to the requesting client device. And in some embodiments, if there were corresponding non-speech signals, the content handling module 210 may also provide the corresponding non-speech signals to the requesting client device. In some embodiments (e.g., a live broadcast, where no translated audio signal(s) are found, etc.) the content handling module 210 coordinates with a source of the audio content (e.g., the client device 120 and/or the content server 110) to receive the audio content for translation. The content handling module 210 buffers the received audio content.

The pre-processing module 220 may preprocess received audio content from the content handling module 210. Pre-processing may include signal separation where the pre-processing module 220 determines respective audio signals for some or all of the speakers in the audio content (e.g., via speech recognition). The pre-processing module 220 also pre-processes some or all of the determined audio signals to determine respective speaker information. Pre-processing may include, windowing, filtering (e.g., noise suppression, signal amplification, etc.), performing speech-to-text conversion (e.g., machine text), generating vectorized representations of an audio signal (e.g., hidden units that are not necessarily human-readable text), some other form of signal processing, or some combination thereof. For example, the pre-processing module 220 may isolate an audio signal associated with a speaker from the buffered audio content and convert the isolated audio signal to corresponding text that is in the same language as speech described by the audio signal.

The dynamic translation module 230 dynamically translates the speech information to one or more target languages using the TU model. As described above, the dynamic translation module 230 may operate on a text representation of the audio or another machine encoding that is not necessarily human-readable text. The one or more target languages may have been specified in, e.g., the request (e.g., received from the client device). The TU model is a machine learned model that forms TUs from the speech information associated with a given audio signal (and corresponding speaker), and translates the TUs to the target language to form a translated unit. For speech information associated with a given audio signal, the TU model may determine a dynamic threshold for an amount of the speech information in the source language that forms a TU. Note that as more speech is included, a length of time describing the TU increases (as the TU includes more speech). The dynamic threshold is dynamic in that it can change throughout a stream of received speech based on the target language and the content of the speech information in the source language. Differences in vocabulary, grammar, tone, etc., between the source language and the target language may also affect the dynamic threshold. The TU model selects the dynamic threshold such that, for a given source language-target language pair, an amount of speech information in a TU is relatively small, but not small enough such that a target accuracy of the translation is not met. In some embodiments, the TU model selects the dynamic threshold such that, for a given source language-target language pair, the TU size is a minimum size that can be translated with at least the target accuracy. Once the dynamic threshold for the TU is met, the TU model translates the TU to the target language forming a corresponding translated unit.

As a size of a TU can vary from one TU to a next TU (e.g., due to differences in grammar between the source language and a target language) there may be a latency between corresponding translated units. This latency if not addressed could result in awkward pauses in the translation.

The filler module 240 monitors delays between a most recent translated unit and a forthcoming translated unit (which may be delayed until the TU criteria is met) to determine whether filler content should be generated to offset the delays. For example, in cases where latency between a most recent translated unit and a forthcoming (i.e., a next) translated unit is less than a threshold time value, the filler module 240 may determine that no filler content be generated. In contrast, if the latency between the most recent translated unit and the forthcoming translated unit exceeds a threshold time value, the filler module 240 may determine that filler content should be generated to offset the latency. The threshold time value may be set to a time value such that if exceeded it may introduce an awkward gap in the translation. In some embodiments, the threshold time value may be derived by taking into account a length of the synthesized translated audio signal of the previous translated unit being played back the user minus a buffer (e.g., half the length of the audio being played back). For example, if the previously translated unit is halfway through playback, and the next translatable unit is still in progress, then the filler module 240 may generate filler content for playback before the next translatable unit. Note that the threshold time value may be based in part on, e.g., the target language, the speaker's individual speaking cadence, or other factors. For example, if a cadence of a first target language is much faster than a cadence of a second target language, then a threshold time value associated with translating to the first target language may be shorter than a threshold time value associated with translating to the second target language. As such, in some embodiments, the threshold time value may be selected by the filler module 240 based in part on the target language.

In an embodiment, rather than waiting for a threshold time to pass before generating filler content, the filler module 240 may instead predict a latency between the most recent translated unit and the forthcoming translated unit to anticipate in advance of the threshold being reached. In some instances, the filler module 240 may furthermore predict the length of the latency in order to select filler content that best matches the predicted latency. For example, as speech is received and processed, the filler module 240 may anticipate based on the sequence of untranslated words received thus far, likelihoods of the TU being achieved in different time periods. If the best predicted time period is very short, the filler module 240 does not necessarily generate filler words, or may generate only short filler content. On the other hand, if the best predicted time period is longer, the filler module 240 may generate filler content suitable for the predicted latency. In some embodiments, the filler module 240 may generate discrete filler content that has a fixed time length (e.g., 1 second), and the filler module 240 may fill a gap between translatable units by stringing one or more discrete filler content together. In an embodiment, the filler module 240 may utilize a machine learning model (e.g., a large language model) trained on speech content to generate predictions for the delay time until a TU is available, and may update the prediction as additional words are received.

The filler module 240 may select filler content that is in the target language based in part on the predicted latency. In some embodiments, the filler module 240 uses a filler word selection model to select filler content. In some embodiments, the filler word selection model is a look up table that for a given target language, e.g., maps different latency times to different filler content (e.g., "um", "uh", "so", "like", "breathing," etc.). In other embodiments, the filler word selection model is a machine learned model that outputs filler content in the target language given the predicted latency. In some embodiments, the filler module 240 may select filler content for the target language based in part on the speech characteristics (e.g., determined by the speech synthesis module 250) of the speaker. Once filler content has been determined, the filler module 240 places the filler content after the most recent translated unit to offset the predicted latency.

The speech synthesis module 250 may determine speech characteristics for speakers. Speech characteristics are features of speech that can be used to synthesize speech which mimics the actual speech of the speaker. Speech characteristics include, e.g., pitch, tone, and pace, some other feature that describes the actual speech of the speaker, or some combination thereof. In some embodiments, the speech synthesis module 250 uses a machine learned model to determine the speech characteristics associated with the one or more speakers associated with the speech information and/or audio stream(s).

The speech synthesis module 250 may receive, for each stream of speech information, a corresponding stream of translated units that may have some filler content. The speech synthesis module 250 synthesizes one or more translated audio signals that are in the target language using the translated units and the filler content (to the extent it is present). The speech synthesis module 250 may synthesize the translated audio signal using, e.g., a synthesis model (e.g., neural text-to speech, some other machine learned model), concatenative synthesis, formant synthesis, some other voice synthesis method, or some combination thereof. In some embodiments, the speech synthesis module 250 may synthesize the translated audio stream using the determined speech characteristics of the speaker. In this manner, the translated audio stream may mimic how the speaker may sound if they were actually speaking in the target language. The speech synthesis module 250 provides, via a network (e.g., the network 140) the one or more translated audio signals to a client device that requested the translation.

In some embodiments, the translation system 130 may also provide some or all of any non-speech signals (that were part of the audio content) with the one or more translated audio signals. In this manner, the client device 120 may render the translated audio signal along with the associated non-speech signals to provide a more natural sound (v. only rendering the translated speech without other sounds that were present in the original audio content).

In some embodiments, the speech synthesis module 250 may synthesize the translated audio signal such that pronunciation times for some of the content in the translated audio signal are adjusted (e.g., slowed or sped up). The amount of adjustment for a particular word or phrase may be based on times between adjacent translated units, adjacent filler content, or filler content that is adjacent to a translated unit. In this manner, the speech synthesis module 250 may control continuity of translated speech in the translated audio signal. For example, instead of or in addition to using filler content to avoid latency-based delays in translated speech output, the speech synthesis module 250 may subtly slow output of the translated audio to extend the output time of one or more TUs. In other instances, where filler content is generated based on predicted delay, the speech synthesis module 250 may subtly speed up the output time of one or more TUs when the predicted time and associated filler content ends up being longer than the actual delay. The speed adjustments may be performed in a manner that is natural sounding from the perspective of the listener and maintains the output speech within expected ranges of tone, cadence, etc. for the particular speaker. Note in some embodiments, the audio signal has corresponding video content. The speech synthesis module 250 may synchronize the translated audio signal with corresponding video frames of the video content to form translated video content, and provide the translated video content to the client device.

The machine-learning training module 260 trains machine learning models used by the translation system 130. For example, the machine-learning training module 260 may train the TU model, filler word selection model, a synthesis model, some other machine learned model, or some combination thereof. The translation system 130 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The translation system 130 generates the set of parameters for a machine learning model by "training" the machine learning model. Once trained, the machine learning model uses the set of parameters to transform inputs into outputs.

The translation system 130 trains a machine learning model based on a set of training examples. Each training example includes input data to which the machine learning model is applied to generate an output. For example, for a TU model, each training example may include words and/or phrases in multiple languages, grammar rules for multiple languages, other information relevant to training determining of TUs and translation thereof, etc. Training examples for the filler word selection model may include, e.g., filler words for multiple languages, speech characteristics for various speakers, other information relevant to training filler word selection, etc. Training examples for the synthesis model may include, e.g., speech characteristics for various speakers, phonemes, language samples in various languages, other information relevant to training speech synthesis, speech representation units (learned from speech directly—e.g., HuBERT), some other relevant training examples, or some combination thereof. In some cases, the training examples also include a label which represents an expected output of the machine learning model. In these cases, the machine learning model is trained by comparing its output from input data of a training example to the label for the training example.

The machine-learning training module 260 may apply an iterative process to train a machine learning model whereby the machine-learning training module 260 trains the machine learning model on each of the set of training examples. To train a machine learning model based on a training example, the machine-learning training module 260 applies the machine learning model to the input data in the training example to generate an output. The machine-learning training module 260 scores the output from the machine learning model using a loss function. A loss function is a function that generates a score for the output of the machine learning model such that the score is higher when the machine learning model performs poorly and lower when the machine learning model performs well. In cases where the training example includes a label, the loss function may also be based on the label for the training example. Some example loss functions include the mean square error function, the mean absolute error, hinge loss function, and the cross-entropy loss function. The machine-learning training module 260 updates the set of parameters for the machine learning model based on the score generated by the loss function. For example, the machine-learning training module 260 may apply gradient descent to update the set of parameters.

For a source language-target language pair, in some embodiments, the loss function for the TU model is configured to train the TU model to form short TUs that still maintain a target accuracy of the translation. For example, the loss function for the TU model may be configured to train the TU model to use minimum lengths for TUs (i.e., minimize an amount of speech information that forms a TU) while maintaining the target accuracy of the translation. Note that by keeping the TUs relatively short it can help reduce latency in a translation. However, setting the target accuracy to be relatively high (e.g., 98% or higher) may cause a length of a TU to increase which may introduce some latency between translated units. Note that the translation accuracy may be tuned based on language. In some embodiments, translation accuracy may be determined using, e.g., Recall-Oriented Understudy for Gisting Evaluation (ROUGE), Bilingual Evaluation Understudy (BLEU), semantic similarity, or some combination thereof. The translation system 130 can address latency using, e.g., the filler content as described above. In this manner, the translation system 130 can provide a highly accurate translation without introducing awkward gaps in the translated audio signal. This can be particularly useful for content that is being live streamed (i.e., broadcast live), where the translation system 130 generates a translated audio signal and/or translated video content and provides it to the client device 120 all in real-time.

Note the above discussion generally references multiple machine learned models and training for those models. In other embodiments, instead of using multiple machine learned models (e.g., TU model, filler word model, etc.), some or all of the machine learned models may be combined. For example, in some embodiments, there may be a single machine learned model that has the functionality of all of the machine learned models.

The data store 270 stores data for use by the client device 120. Data in the data store 270 may include, e.g., audio signals, non-speech signals, speech information, translated audio signals, TUs, translated units, filler content, speech characteristics for one or more speakers, and other data relevant for use by the translation system 130, or any combination thereof. The data store 270 also stores trained machine learning models trained by the machine-learning training module 260. For example, the data store 270 may store the set of parameters for a trained machine learning model on one or more non-transitory, computer-readable media. The data store 270 uses computer-readable media to store data, and may use databases to organize the stored data.

Figure 3A:
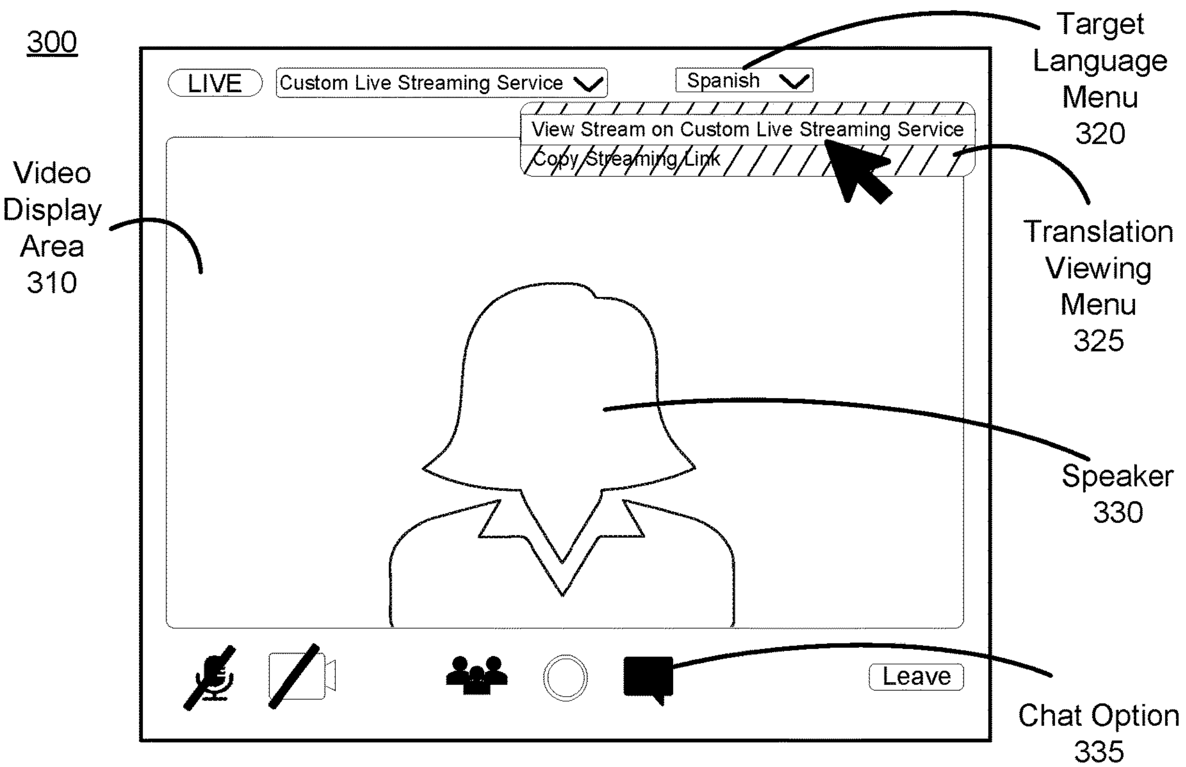
FIG. 3A is an example graphical user interface for conducting a video conference, in accordance with one or more embodiments.

FIG. 3A is an example graphical user interface (GUI) 300 for conducting a video conference, in accordance with one or more embodiments. The GUI 300 may be presented on a client device 120 and is an embodiment of an interface module (e.g., the interface module 150). As shown, the GUI 300 is a user interface through which a user of the client device may participate in a video conference. In the illustrated embodiment, the GUI 300 includes a video display area 310, a target language menu 320, a translation viewing menu 325, and various controls for the video conference. In other embodiments, the GUI 300 includes different or additional elements. In addition, the functions may be distributed among the elements in a different manner than described.

The video display area 310 presents video content. The video content may be from, e.g., a content server (e.g., the content server 110) and/or another client device. The video content includes corresponding audio content that can be presented via, e.g., speakers of the client device. The audio content includes spoken content from a speaker 330 that is in a source language. In the illustrated embodiment, the video content is being broadcast live. In embodiments not shown, the video content may have been pre-recorded and the pre-recorded video content is being streamed to the client device for presentation via the GUI 300.

The target language menu 320 provides options for one or more different target languages to translate the audio content. A user may select which target language of the one or more different target languages to translate the audio content. In the illustrated embodiment, the user has selected "Spanish" as the target language.

The translation viewing menu 325 provides options for interfacing with the translation. In the illustrated embodiment, the translation viewing menu 325 lists two options. The first option is to "View Stream on Custom Live Streaming Service," and the second option is to "Copy Streaming Link." In this embodiment, selection of the section option allows a user to copy a link. The link may be used with a browser on the client device, shared with other client devices, etc. The link may be used with a browser to access translated video content from the translation system 130. The translated video content is generated by the translation system 130 using the video content and associated audio content. In the illustrated embodiment, the user selects the first option. Responsive to the selection, the client device coordinates with a translation system to translate the audio content and opens a GUI as described below with regard to FIG. 3B.

In the illustrated embodiment, the GUI 300 includes a chat option 335. The chat option 335 may be used to distribute text content, including e.g., the streaming link discussed above, to other conference participants. In this manner, the user of the client device may distribute the streaming link via the chat option to a client device used associated with a conference participant. And the conference participant may simply click on the streaming link that appears in their chat to access (e.g., via the GUI of FIG. 3B) the translated video content.

Figure 3B:
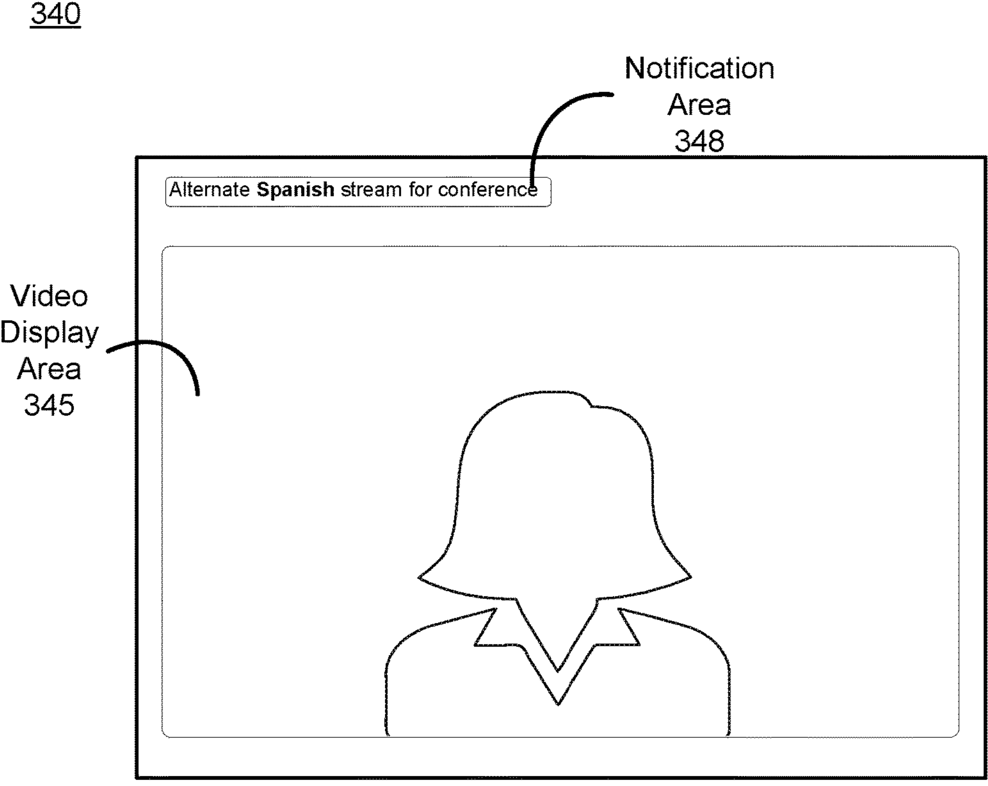
FIG. 3B is an example graphical user interface presenting translated video content for the video conference of FIG. 3A.

FIG. 3B is an example GUI 340 presenting translated video content for the video conference of FIG. 3A. The GUI 340 is presented on the client device of FIG. 3A. The GUI 340 is an example interface of the interface module through which a user of the client device may view translated video content for the video conference. In the illustrated embodiment, the GUI 340 includes a video display area 345 and a notification area 348. The video display area 345 is substantially the same as the video display area 310, except that it is presenting translated video content. The notification area 348 alerts the user that translated video content is being presented. In this embodiment, the alert is a window showing that an alternate stream for the video conference in the target language (e.g., Spanish) is being presented. In other embodiments, the GUI 300 includes different or additional elements. For example, the GUI 340 may include various controls for the video conference. In addition, the functions may be distributed among the elements in a different manner than described.

Figure 3C:
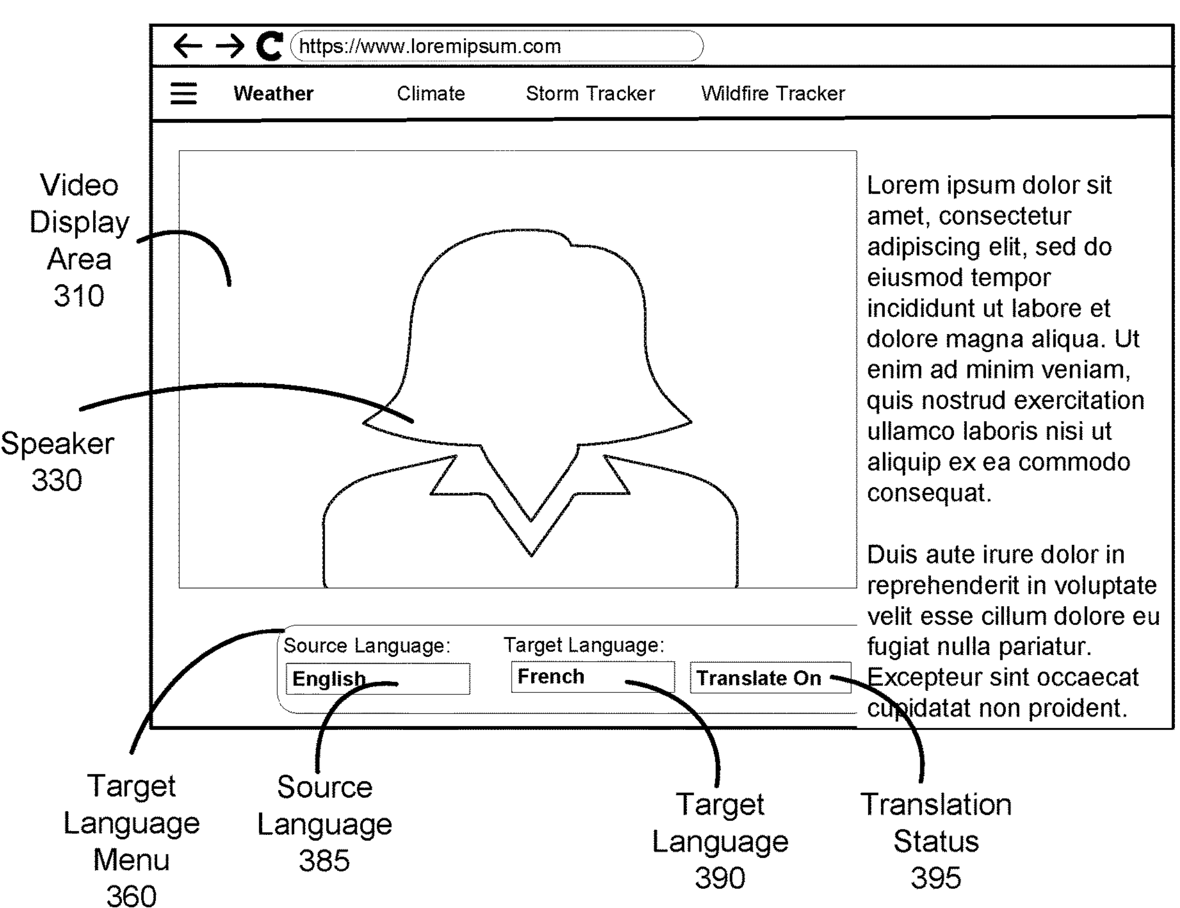
FIG. 3C is an example graphical user interface that includes a target language menu, in accordance with one or more embodiments.

FIG. 3C is an example GUI 350 that includes a target language menu 360, in accordance with one or more embodiments. The GUI 350 is an embodiment of an interface module (e.g., the interface module 150). In the illustrated embodiment, the GUI 350 includes the video display area 310, the target language menu 360, and may also include various text content. In other embodiments, the GUI 350 includes different or additional elements. In addition, the functions may be distributed among the elements in a different manner than described.

In the illustrated embodiment, the GUI 350 is a browser presenting content on a client device (e.g., the client device 120) from a website (e.g., a news website). The presented content includes audio content from the speaker 330. The audio content may have corresponding video content that is presented via the video display area 310.

The target language menu 360 provides options for one or more different target languages to translate the audio content. A user may use the target language menu 360 to select a target language for the translation of the audio content presented on the website. In the illustrated embodiment, the user has selected "French" as the target language. In this embodiment, the target language menu 360 also presents a source language 385 for the audio content. In some embodiments, the source language 385 is automatically detected by a translation system (e.g., the translation system 130) and presented as the source language 385. In other embodiments, the source language 385 may be selected by the user of the client device. As the source language 385 differs from the target language 390 in the illustrated embodiment, the interface module coordinates with the translation system to translate the audio content (which may be part of video content) that is streamed from the website. The translation system translates the audio content and provides a translated audio signal (or translated video content) for the speaker 330 to the client device for presentation via the GUI 350.

Figure 4:
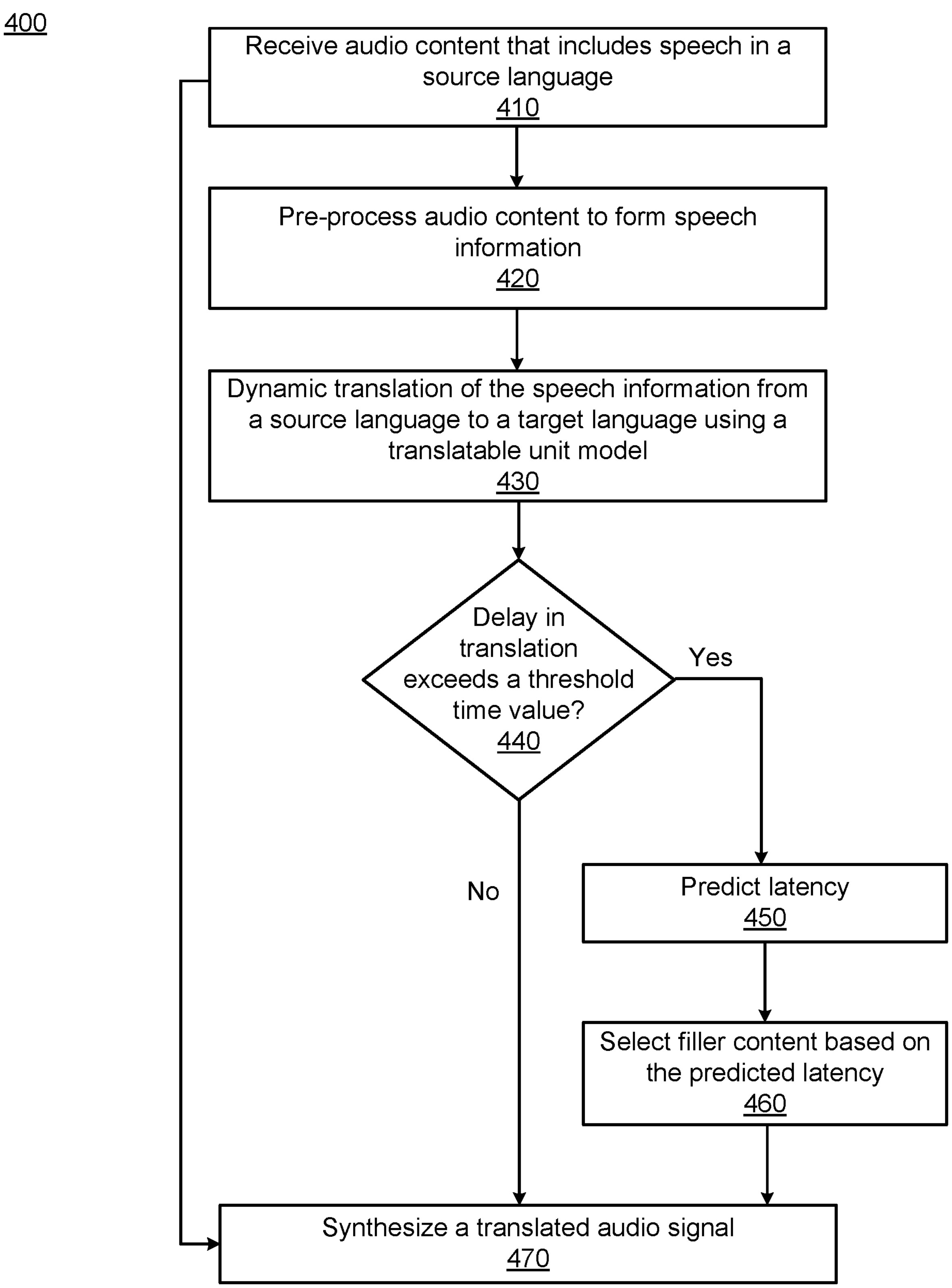
FIG. 4 is a flowchart for a process for speech translation using latency based filler generation, in accordance with some embodiments.

FIG. 4 is a flowchart for a process for speech translation using latency-based filler generation, in accordance with some embodiments. Alternative embodiments may include more, fewer, or different steps from those illustrated in FIG. 4, and the steps may be performed in a different order from that illustrated in FIG. 4. These steps may be performed by a translation system (e.g., translation system 130). Additionally, each of these steps may be performed automatically by the translation system without human intervention.

The translation system receives 410 audio content (e.g., as an audio stream) that includes speech in a source language. The speech is from a speaker, and the speech corresponds to an audio signal in the audio content. In some embodiments, the translation system may have received a request to translate the audio content from a client device (e.g., the client device 120) to a target language. The translation system may receive the audio content from, e.g., the client device and/or a content server (e.g., the content server 110). The translation system may buffer the received audio content.

The translation system pre-processes the audio content to form speech information. The translation system pre-processes the audio content to determine an audio signal for the speaker in the audio content (e.g., via speech recognition). The translation system 420 also pre-processes (e.g., windowing, filtering, speech-to-text conversion, generating vectorized representations of an audio signal, etc.) the audio signal to determine speaker information for the speaker.

The translation system dynamically translates 430 the speech information in a source language to the target language using a TU model. The TU model may determine a dynamic threshold for an amount of the speech information in the source language that is used to form a TU. And responsive to reaching the dynamic threshold for the TU, the TU model translates the TU to the target language to form a translated unit.

The translation system determines 440 whether a delay in translation exceeds a threshold time value. For example, the translation system may determine whether a delay between a most recent translated unit and a next translated unit exceeds the threshold time value. The translation system may determine the threshold value based in part on the target language.

In cases where the delay does not exceed the threshold time value, the process moves to step 470 described below. In cases where the delay does exceed the threshold time value, the translation system may predict 450 latency between a most recent translated unit and a forthcoming (i.e., next) translated unit. In some embodiments, the translation system may utilize a machine learning model trained on speech content to predict the latency.

The translation system selects 460 filler content based in part on the predicted latency. The selected filler content is in the target language. The translation system may select the filler content by applying the predicted latency to a filler word selection model that outputs the filler content. Translated filler content may be selected from a predefined list or may repeat a previously translated phrase. The filler content may be selected arbitrarily, or using selection rules (which may be based on predicted delay period to fill), or may be selected based on language model that predicts most commonly used filler phrases in context of previously translated speech. In some embodiments, the translation system may generate discrete filler content that has a fixed time length (e.g., 1 second).

Note in some embodiments, in lieu of steps 450 and 460, the translation system instead selects filler content that is in the second language based in part on the delay, and selects the filler content to at least partially fill the delay.

The translation system synthesizes 470 a translated audio signal. The translation system may synthesize the translated audio signal using translated units and, if present, the filler content. The translation system may synthesize the translated audio signal using, e.g., a synthesis model (e.g., neural text-to speech, some other machine learned model), concatenative synthesis, formant synthesis, some other voice synthesis method, or some combination thereof. In some embodiments, the translation system may synthesize the translated audio such that pronunciation times for some of the content in the translated audio signal is adjusted (e.g., slowed). The amount of adjustment may be based on, e.g., the predicted latency. In some embodiments, the translation system may also determine (e.g., via a machine learned model) speech characteristics (e.g., pitch, tone, and pacing) for the speaker. In some embodiments, the translation system may synthesize the translated audio stream using the determined speech characteristics such that the translated speech is presented in a similar manner that the speaker speaks.

The translation system may provide the translated audio stream to the requesting client device (e.g., for presentation to the user of the client device). In some embodiments, the translation system may also provide some or all of any non-speech signals (that were part of the audio content) with the one or more translated audio signals. In some embodiments, the translation system stores the translation (and some or all of any non-speech signals) in a data store (e.g., the data store 270). The translation system may stream the stored translated audio (and some or all of any non-speech signals) to client devices upon request.

Figure 5:
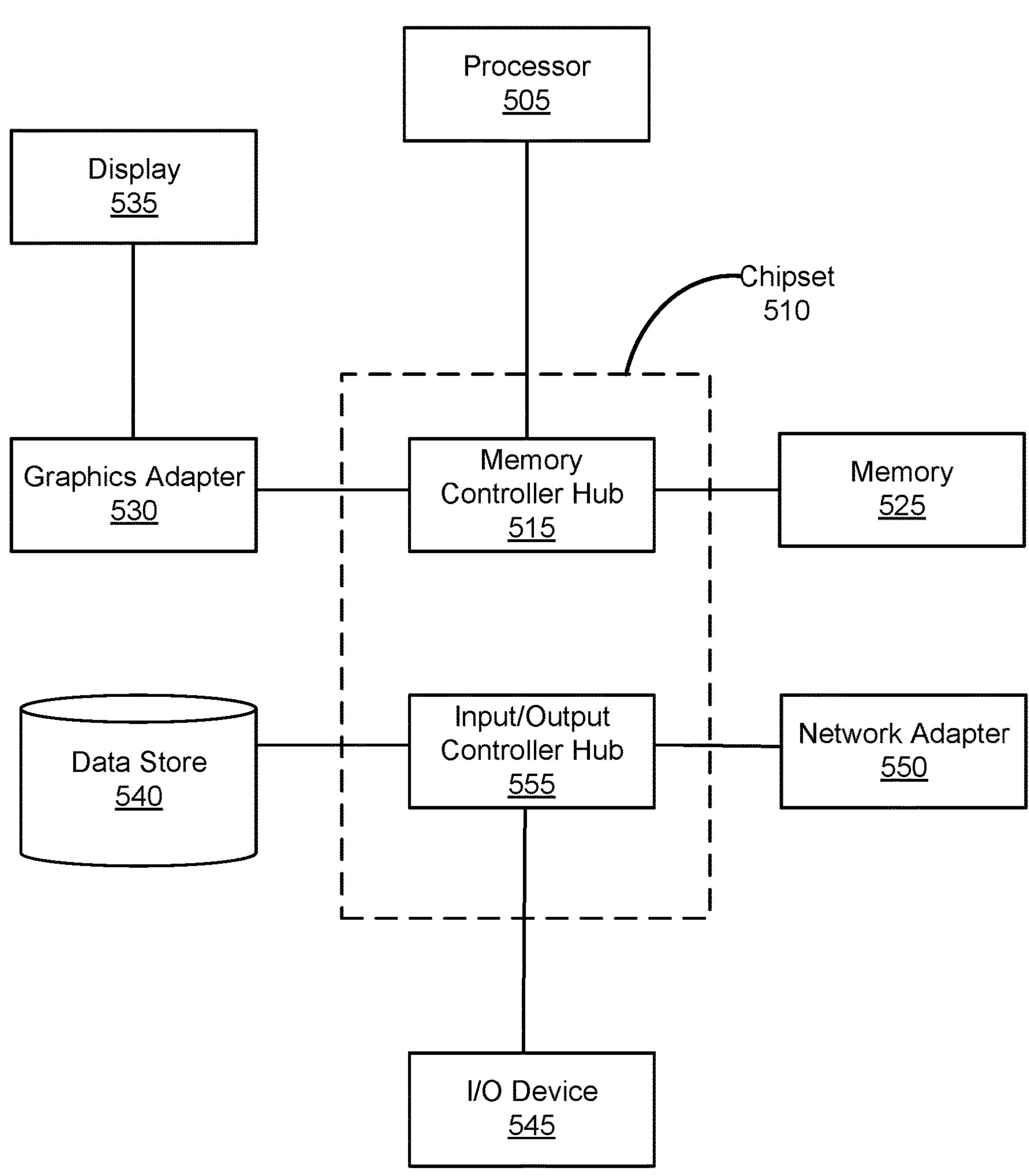
FIG. 5 is a high-level block diagram illustrating an example of a computer, in accordance with one or more embodiments.

FIG. 5 is a high-level block diagram illustrating an example of a computer 500 for use as a client device 120 in accordance with one or more embodiments. Illustrated are at least one processor 505 coupled to a chipset 510. The chipset 510 includes a memory controller hub 515 and an input/output (I/O) controller hub 520. A memory 525 and a graphics adapter 530 are coupled to the memory controller hub 520, and a display 535 is coupled to the graphics adapter 530. A data store 540, one or more I/O devices 545, and network adapter 550 are coupled to the I/O controller hub 555. Other embodiments of the computer 500 have different architectures. For example, the memory 525 is directly coupled to the processor 505 in some embodiments.

The data store 540 includes one or more non-transitory computer-readable storage media such as a hard drive, solid-state memory device, or other storage medium.

The memory 525 holds instructions and data used by the processor 505. The one or more I/O devices 545 may be used to input data into the computer 500. The graphics adapter 530 displays images and other information on the display 535. In some embodiments, the display 535 includes a touch screen capability for receiving user input and selections. The network adapter 550 couples the computer 500 to a network (e.g., the network 140). In an embodiment, the client device 120 can be a notebook or desktop computer, a tablet computer, a gaming console, a head-mounted display device, a mobile phone, or other computing device.

The translation system 130 and/or content server 110 may comprise one or more enterprise computing or storage systems, cloud computing or storage systems, or a combination thereof and may be implemented utilizing local or cloud-based servers. The servers may include physical servers, virtual machines, or a combination thereof. Cloud-based servers may include private cloud systems, public cloud systems, hybrid public/private cloud systems, or a combination thereof. Furthermore, different portions of the translation system 130 and/or content server 110 may execute on different remote servers and various system elements of the translation system 130 and/or content server 110 may be communicatively coupled over the network 140. Some functions of the translation system 130 and/or content server 110 may utilize services accessible via an application programming interface (API) associated with respective services.

The computer 500 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the data store 540, loaded into the memory 525, and executed by the processor 505.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method, performed at a computer system comprising a processor and a non-transitory computer readable medium, comprising:

- receiving, from a first client device over a network, a streaming input audio signal in a first language;
- converting the streaming input audio signal to a streaming machine-encoded representation;
- dynamically translating the streaming machine-encoded representation of speech information that is in the first language to a machine-encoded representation corresponding to a second language using a translation model that translates a sequence of translatable units of varying lengths in the first language to respective translated units in the second language, wherein at each translation step, the translation model:
  - determines when a dynamic threshold is reached indicating that sufficient speech information is received to form a translatable unit, and
  - responsive to reaching the dynamic threshold for the translatable unit, translating the translatable unit to the second language to form a translated unit;
- synthesizing and outputting, in an output audio stream provided over a network to a second client device, a most recent translated unit;
- responsive to a delay between outputting the most recent translated unit and availability of a forthcoming next translated unit exceeding a threshold time value, selecting filler content that is in the second language to at least partially fill the delay;
- synthesizing and outputting to the second client device over the network, the filler content in the output audio stream; and
- upon availability of the next translated unit, synthesizing and outputting to the second client device over the network, the next translated unit in the output audio stream.

2. The method of claim 1, wherein determining when the dynamic threshold is reached is based in part on a target accuracy for translating the translatable unit and grammar differences between the first language and the second language.

3. The method of claim 2, wherein the translation model is trained to dynamically adjust the dynamic threshold to minimize an amount of speech information that forms a translatable unit while maintaining the target accuracy.

4. The method of claim 1, wherein selecting the filler content comprises:

- determining speech characteristics of the speech information, and
- selecting the filler content based in part on the speech characteristics.

5. The method of claim 1, wherein the streaming input audio signal has corresponding video content, the method further comprising:

- synchronizing the output audio stream with corresponding video frames of the video content to form translated video content, and
- outputting the translated video content to a client device.

6. The method of claim 1, wherein selecting the filler content comprises:

- predicting the delay between outputting the most recent translated unit and the availability of the next translated unit, and
- applying the predicted delay to a filler word selection model that outputs the filler content.

7. The method of claim 1, wherein synthesizing and outputting the most recent translated unit comprises:

- adjusting a pronunciation time for the most recent translated unit in the output audio stream based in part on the delay.

8. A non-transitory computer-readable storage medium comprising stored instructions, the instructions when executed by a processor of a device, cause the device to:

- receive, from a first client device over a network, a streaming input audio signal in a first language;
- convert the streaming input audio signal into a streaming machine-encoded representation;
- dynamically translate the streaming machine-encoded representation of speech information that is in the first language to a machine-encoded representation corresponding to a second language using a translation model that translates a sequence of translatable units of varying lengths in the first language to respective translated units in the second language, wherein at each translation step, the translation model is configured to:
  - determine when a dynamic threshold is reached indicating that sufficient speech information is received to form a translatable unit, and
  - responsive to reaching the dynamic threshold for the translatable unit, translate the translatable unit to the second language to form a translated unit;
- synthesize from the streaming machine-encoded representation, and output in an output audio stream provided over a network to a second client device, a most recent translated unit;
- responsive to a delay between outputting the most recent translated unit and availability of a next translated unit exceeding a threshold time value, select filler content to at least partially fill the delay;
- synthesize and output to the second client device over the network, the filler content in the output audio stream; and
- upon availability of the next translated unit, synthesize and output to the second client device over the network, the next translated unit in the output audio stream.

9. The non-transitory computer-readable storage medium of claim 8, wherein determining when the dynamic threshold is based in part on a target accuracy for translating the translatable unit and grammar differences between the first language and the second language.

10. The non-transitory computer-readable storage medium of claim 9, wherein the translation model is trained to dynamically adjust the dynamic threshold to minimize an amount of speech information that forms a translatable unit while maintaining the target accuracy.

11. The non-transitory computer-readable storage medium of claim 8, wherein selecting the filler content comprises:

determining speech characteristics of the speech information, and selecting the filler content based in part on the speech characteristics.

12. The non-transitory computer-readable storage medium of claim 8, wherein the streaming input audio signal has corresponding video content, the non-transitory computer-readable storage medium further comprising stored instructions that when executed cause the device to:

synchronize the output audio stream with corresponding video frames of the video content to form translated video content, and output the translated video content to a client device.

13. The non-transitory computer-readable storage medium of claim 8, where the stored instructions to select the filler content further comprise stored instruction that when executed cause the device to:

predict the delay between outputting the most recent translated unit and the availability of the next translated unit, and apply the predicted delay to a filler word selection model that is configured to output the filler content.

14. The non-transitory computer-readable storage medium of claim 8, wherein the stored instructions to synthesize and output the most recent translated unit further comprise stored instructions that when executed cause the device to:

adjust a pronunciation time for the most recent translated unit in the output audio stream based in part on the delay.

15. A computer system comprising:

a processor; and a non-transitory computer readable storage medium having instructions encoded thereon that, when executed by the processor, cause the processor to:

receive a streaming input audio signal in a first language;

convert the streaming input audio signal to a streaming machine-encoded representation;

dynamically translate the streaming machine-encoded representation of speech information that is in the first language to a machine-encoded representation corresponding to a second language using a translation model that translates a sequence of translatable units of varying lengths in the first language to respective translated units in the second language, wherein at each translation step, the translation model is configured to:

determine when a dynamic threshold is reached indicating that sufficient speech information is received to form a translatable unit, and responsive to reaching the dynamic threshold for the translatable unit, translate the translatable unit to the second language to form a translated unit;

synthesize and output, in an output audio stream provided over a network to a second client device, a most recent translated unit;

responsive to a delay between outputting the most recent translated unit and availability of a next translated unit exceeding a threshold time value, select filler content to at least partially fill the delay;

synthesize and output to the second client device over the network, the filler content in the output audio stream; and upon availability of the next translated unit, synthesize and output to the second client device over the network, the next translated unit in the output audio stream.

16. The computer system of claim 15, wherein the translation model is trained to dynamically adjust the dynamic threshold to minimize an amount of speech information that forms a translatable unit while maintaining a target accuracy.

17. The computer system of claim 15, wherein selecting the filler content comprises:

determining speech characteristics of the speech information, and selecting the filler content based in part on the speech characteristics.

* * * * *